United States Patent
Haas et al.

(10) Patent No.: US 6,363,302 B1
(45) Date of Patent: Mar. 26, 2002

(54) METHOD AND APPARATUS FOR OPERATING A CONTROL UNIT FOR CONTROLLING OPERATIONAL SEQUENCES IN A VEHICLE

(75) Inventors: Wolfgang Haas, Korntal-Muenchingen; Michael Bleile, Reutlingen; Andreas Frank, Sindelfingen; Thomas Meier, Untergruppenbach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/566,439

(22) Filed: May 8, 2000

(30) Foreign Application Priority Data

May 7, 1999 (DE) .......................... 199 21 065

(51) Int. Cl.$^7$ .......................... F02D 45/00; B60R 16/02
(52) U.S. Cl. .............................. 701/1; 29/31
(58) Field of Search .............................. 701/1, 29, 31, 701/33

(56) References Cited

U.S. PATENT DOCUMENTS

| | | | | |
|---|---|---|---|---|
| 4,831,560 A | * | 5/1989 | Zaleski | 364/551.01 |
| 5,214,582 A | * | 5/1993 | Gray | 364/424.03 |
| 5,523,948 A | * | 6/1996 | Adrain | 364/431.01 |
| 5,550,762 A | * | 8/1996 | Doll | 364/579 |

FOREIGN PATENT DOCUMENTS

| | | |
|---|---|---|
| DE | 33 18 410 | 11/1984 |
| DE | 39 17 979 | 12/1990 |
| EP | 585769 A1 * | 3/1994 |

* cited by examiner

Primary Examiner—Michael J. Zanelli
(74) Attorney, Agent, or Firm—Kenyon & Kenyon

(57) ABSTRACT

A method and an apparatus for operating a control unit for controlling operational sequences in a vehicle. When operational sequences are error-free, the control functions of the built-in control unit are partially or completely suppressed. This allows additional functions to be switched in and out, and also allows modification and/or adaptation of data and/or programs that are accessed by the control functions. In the specific operating instance of the application, a further control unit is insertable into the vehicle wiring harness between the first control unit and a sensor arrangement, collection, group or system and an actuator arrangement, collection, group or system. The control functions suppressed in the control unit are then performable by the second control unit. The control unit then performs only the measurement functions and actuation functions The sequence is initiated and controlled by integrated remote-control functions, which are in addition to the normal or other functions. Since the second control unit is accessible and is designed in accordance with its application task, the application of the control unit may be performed using control functions exported therefrom.

12 Claims, 6 Drawing Sheets

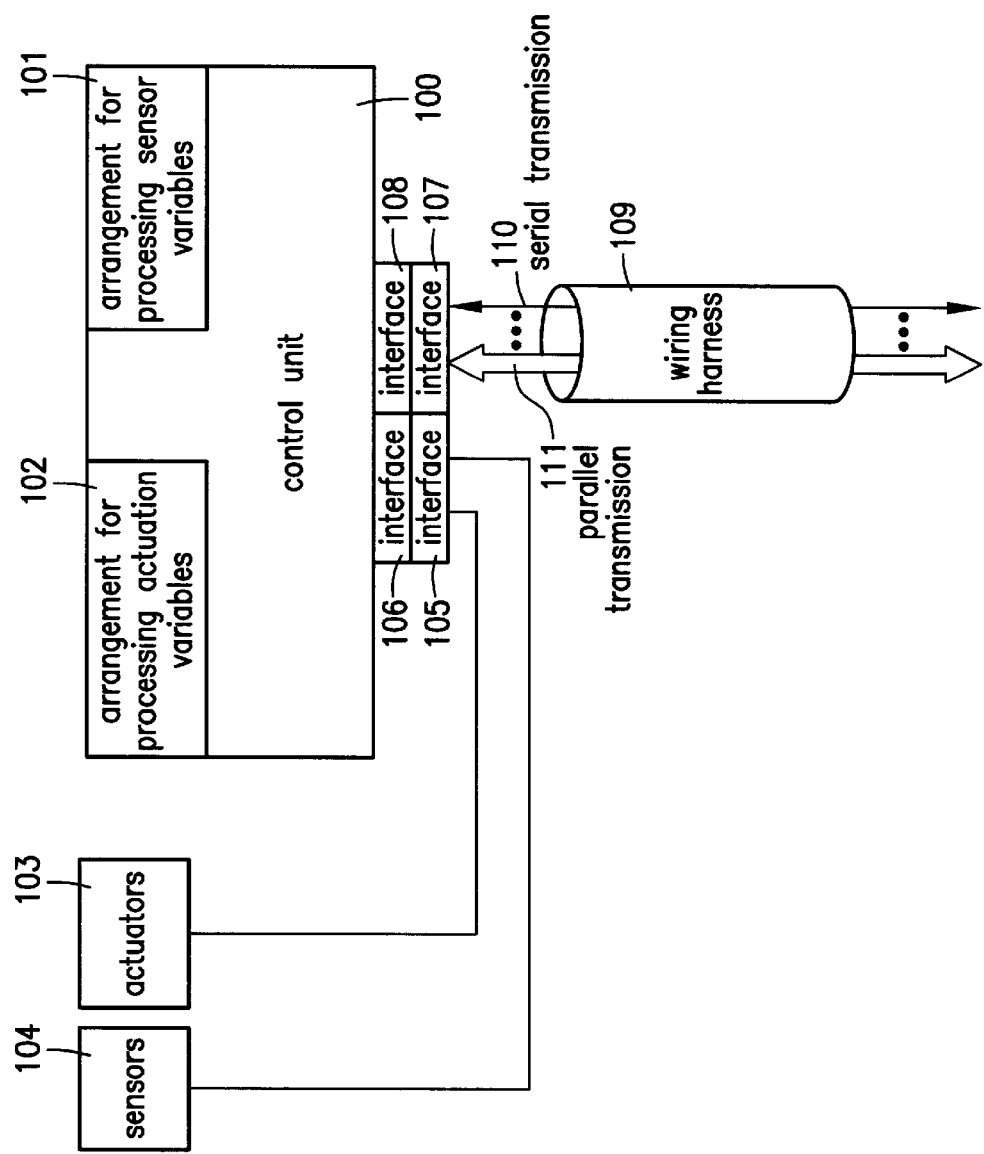

METHOD AND APPARATUS FOR OPERATING A CONTROL UNIT FOR CONTROLLING OPERATIONAL SEQUENCES IN A VEHICLE

FIELD OF THE INVENTION

The present invention relates to a method and an apparatus for operating a control unit for controlling operational sequences in a vehicle.

BACKGROUND INFORMATION

One special operating case in the context of a method and an apparatus for operating a control unit for controlling operational sequences in a vehicle is the modification and/or adaptation of data and/or programs which are accessed by the control functions. What may be used for this purpose is an application device that is equipped with additional hardware. This additional hardware may contain an external memory and an application interface. The built-in local control device to be applied must, for that purpose, be connected to the application device. For that purpose, the local control device is opened and a memory module of the local control device is removed. In place of that memory module, the application interface and an external memory are connected to the local control device. The control functions continue to be localized in the local control device.

German Patent Application No. 33 18 410 describes a method of this kind for modifying and optimizing data and program sequences for a programmed control device, in particular to control ignition, fuel injection, or transmission shifting operations in motor vehicles. In this context, a modifiable-content program and a data memory arrangement is connected in the place of the regular memory arrangement of the programmable control device, and is loaded with its data. This may be done because the regular memory arrangement can be removed, and a plug that connects the microprocessor of the programmable control device to the modifiable-content memory arrangement can be inserted into a socket that is thereby rendered unoccupied. To the memory arrangement is coupled a computer having an input keyboard, with which the data or the contents of the memory arrangement can be modified. The external computer ascertains the new or modified memory contents in real time, and cyclically pass those ascertained results to the memory arrangement, where they take the place of the previous data. The control device accesses these new data in accordance with its previous function. It is therefore possible to use the series-production control devices (i.e., the respective local control device) to test modifications and to introduce and optimize additional functions.

A further apparatus for data manipulation is described by German Patent No. 39 17 979, which describes an emulation device for a control device that has at least one microprocessor and one data/program read memory. Additionally provided in this context, once again, is a data manipulation device that has a write/read memory which is connected to the microprocessor of the control device. Also provided is an external operating device, which is connectable to a (preferably serial) interface and whose purpose is to modify data of the write/read memory. The data manipulation device arranged in the housing of the control device has a switchover apparatus for switching over read access to the write/read memory or to the data/program read memory, the write/read memory being connected via bus lines to the microprocessor. As a result, it is believed that the operating device can be of substantially simpler design as compared to conventional emulation systems, not least because the data modification can be accomplished partially by way of the control device computer, since the fixed and variable memories are contained in the control device that is to be applied. Two plug-in sockets are provided for this purpose. The data/program read memory is then moved from the first plug-in socket in the control device into the second plug-in socket in the data manipulation device. The second plug-in socket is accessible via a bus system. Into the now-unoccupied first plug-in socket is inserted the data manipulation device, which now contains not only the original data/program read memory but also the write/read memory, and which makes available an interface for the external operating device.

It has been found that the aforesaid existing art does not yield optimum results in every respect. For example, the built-in control device must be opened every time to operate the control device in the aforementioned operating instance. This may entail considerable effort, especially in the case of complexly installed production control devices. A hybrid device that is installed in the oil pan of a transmission, for example, is almost inaccessible for the aforesaid existing art. Mechanically connected control devices, such as, for example, a clutch adjuster, may also increase complexity. One reason for this is that in the existing art, the control functions may continue to be performed by the local control device. Since the additional hardware is introduced only temporarily into the local control device, the latter must have a more complex design than would be necessary based on its actual function. It is also believed that an optimized design in terms of the application is essentially prohibited because of the excessive effort, since each production device would need to be equipped accordingly.

SUMMARY OF THE INVENTION

An exemplary embodiment of a method and an apparatus of the present invention has the advantage of making possible the operation of even poorly accessible control units to control operational sequences in a vehicle. For that purpose, when operational sequences are initially error-free, performance of the control functions in the control unit is at least partially suppressed in reaction to at least one definable condition. As a result, the suppressed control functions can be displaced, for example, into a second control unit. Thus a second control unit, such as, for example, in the form of an application control device, can advantageously be interposed in the original connection interface of the first control unit. The first control unit, such as, for example, the local control device, can thus be used as an intelligent actuator. Of the original functionality of the control functions, measurement functions, and actuation functions, only the measurement functions and the actuation functions, for example, continue to be performed. The control functions are at least partially displaced into the second control unit (the application control device). As a result, the first control unit (the local control device) does not need to be removed or opened. Similarly, the software expressed in the measurement functions, actuation functions, and control functions of the first control unit does not need to be modified. When the control unit is operating, all that needs to be selected is whether operation is to occur in a normal mode or an application mode.

Advantageously, a control device almost identical in design to the first control unit (the local control device) can be used as the second control unit (i.e., as the application control device). It is believed that this should considerably reduce the development outlay.

In addition, however, the second control unit (the application control device) can be of more complex design with no need for this to be true of all first control units (local control devices). For example, an application interface for connecting an external device can be introduced into this second control unit, but this need not be done in the case of the local control device. As a result, the series-production devices should be simpler to construct as compared to other devices, and at the same time an application control device could be manufactured from the outset in a manner optimized to its purpose. Complex and cost-intensive subsequent redesign can thereby be avoided.

Suppression of the performance of control functions can be advantageous not only for the application, or for the modification and/or adaptation of data and/or programs that are accessed by the control functions, but also for other operating instances. For example, when the local control device is being used exclusively and when operational sequences are error-free, it is possible to interrupt additional functions that, for example, are not needed or not desired and that have no safety relevance. This can be done, with the aid of a terminal or any other input capability, by the vehicle occupants themselves or by a repair shop.

BRIEF DESCRIPTION OF THE DRAWINGS

FIG. 1 shows a schematic depiction of a system for controlling operational sequences in a vehicle having a first control unit.

DETAILED DESCRIPTION

Figure 2A:
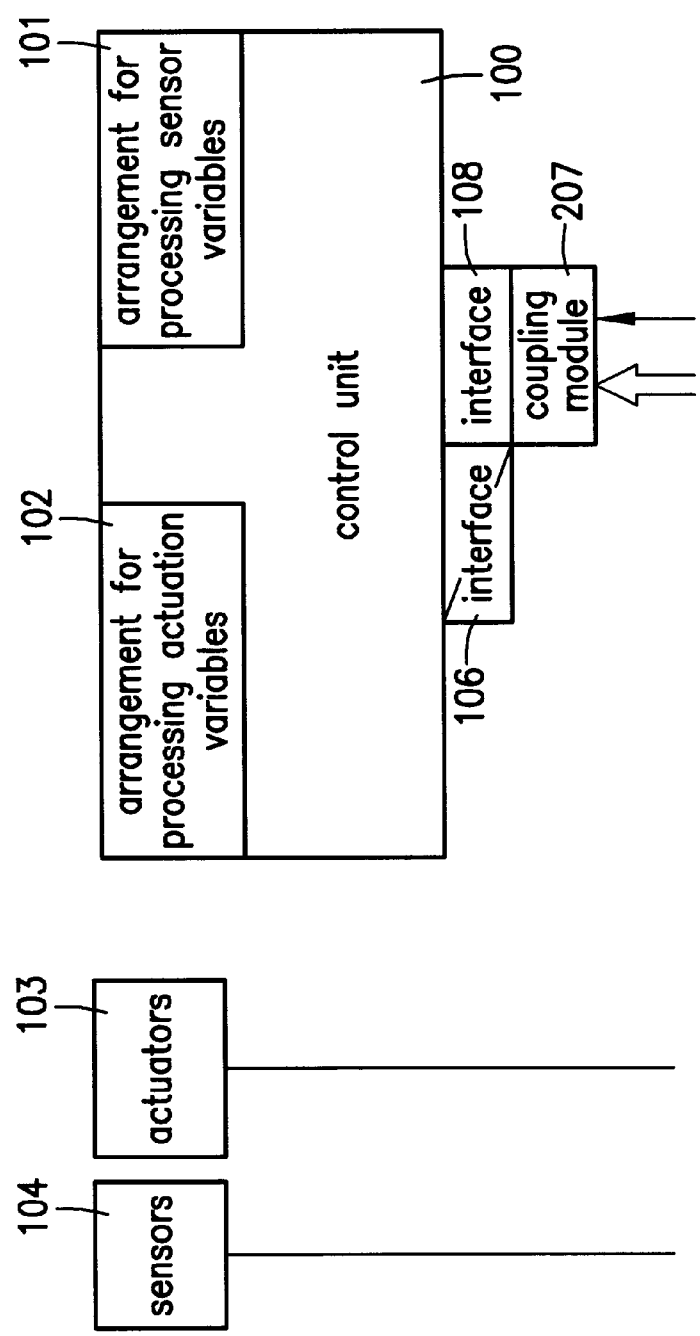
FIG. 2 depicts an arrangement having two control units and an external operating unit.

FIG. 1 schematically shows an exemplary arrangement with a control unit 100 in a vehicle. The number 101 depicts an arrangement control unit 100 that process sensor variables. Also depicted, in addition to these arrangements for processing sensor or measurement variables, is an arrangement 102 for processing actuation variables for an associated actuator arrangement, collection, group or system. Much of the vehicle wiring, in the form of a vehicle wiring harness, is indicated as 109. Both analog and digital signals can be carried in this, and both parallel and serial data transmission is possible. A simple serial transmission is indicated with line 110, whereas 111 diagrams a parallel data transmission, such as, for example, a bus system. Element 103 represents actuators not coupled via the vehicle wiring harness to the control unit. Element 104 similarly represents the further sensors not connected via wiring harness 109. The respective interfaces 105 through 108 are depicted as input and output interfaces in the form of coupling modules or coupling units, including one line-side coupling module and one on the control unit side. In the simplest case, this is based on the male and female parts of a plug connector.

In addition to this simplest form, it may include an already integrated signal processing system, such as, for example, level adaptation, A/D conversion, a sample-and-hold function, etc. With respect to vehicle wiring harness 109, the control device connection is divided into a wiring-harness portion 107 and a control-unit portion 108. A sensor arrangement, collection, group or system and an actuator arrangement, collection, group or system connected externally from the vehicle wiring harness are also connected via a symbolically divided interface. In this context, the line portion is labeled 105 and the control-unit portion 106. A control device arrangement of this kind, which is depicted in FIG. 1, is usable, for example, for a transmission control system, an engine control system, a control system for safety and retention systems or comfort systems, or for a braking control system, etc. A combination of multiple functions in the aforesaid areas is also possible.

In the case of a transmission control system, element 104 could, for example, represent a selector lever with a position switch, and actuation element 103 would then indicate the functionality of selecting the individual gears, such as, for example, by activating pressure controllers and solenoid valves in the transmission. In such a case, the clutch function may resides, for example, in the arrangement for the actuating functions 102. In the case of the transmission control system, sensors may sense, for example, the transmission output rotation speed, the load state and rotation speed of the engine, the selector lever position, and the positions of the program switch and kickdown switch. These measurement functions are processed in the control unit (in this case, the transmission control device) in accordance with a defined program, and the variables to be output therefrom to the transmission are determined. In addition to these control functions, the variables to be output must also be further processed or adapted by way of actuation functions. These actuation functions may include, for example, the activation of electrohydraulic converters, such as, for example in the case of a combined electronic and hydraulic system. These actuation functions may also include the switching in and out of clutches via solenoid valves.

In the case of an engine control system, such as, for example, for an internal combustion engine, element 104 corresponds, for example, to an ignition switch and element 103 corresponds to at least one injection valve. No distinction is made in this context as to whether the connection of elements 103, 104 is not made, or is possible, via vehicle wiring harness 109. Control unit 100 (in this case, the engine control device) may contain an arrangement 101 that may contain measurement functions such as, for example, engine temperature, intake air temperature, intake manifold pressure, etc. Here again, the arrangement 102 can be used for the actuation functions, such as, for example, adjusting the throttle valve via a throttle valve switch.

In the case of a braking control device with systems that enhance braking effect or vehicle stability and/or safety in the vehicle, element 104 corresponds, for example, to at least one wheel rotation speed sensor. Here again, no consideration is given, in terms of elements 104 and 103, as to whether they are not also carried, or could be carried, via vehicle wiring harness 109. Element 103 may then correspond, such as, for example, in the case of a brake hydraulic system, to at least one valve contained therein. Control unit 100 (in this case, the braking control device) may contain, by way of the arrangement 101, measurement functions, such as, for example, wheel rotation speed preprocessing (if this does not occur in the sensor), pressure value processing, etc. The arrangement 102 may then serve, for example, to adjust brake pressure by outputting values or actuation variables to at least one pump and at least one valve, etc. Thus, in such a case, the measurement functions may be implemented by the arrangement 101, and the actuation functions by the arrangement 102. The control functions themselves are localized in control unit 100.

But it is not only separate embodiment of the individual control units and their functions, such as, for example transmission control, engine control, and braking control, that can be implemented in a control unit 100. A mixed implementation, for example from the aforesaid areas of measurement, actuation, and control functions, can also exist in one control unit, or in the case of multiple control units, they can access one another. It is thus possible for a braking control unit or its associated functions to intervene in an engine control unit, i.e., its functions, such as, for example, in the context of an engine drag regulation system or an engine output control system. Thus, several different control functions can also be located in one control unit. A correlation of this kind, such as, for example, a brake intervention or an engine intervention in a braking or engine control system, can also be created between a braking control system and a transmission control system, and between a transmission control system and an engine control system. Provision can thus be made, for example, for a downshift in the transmission when a braking intervention occurs. Provision can also be made for an intervention by the transmission control system in the engine control system and vice versa. Any desired functions, in particular control functions, can thus be localized in one control unit.

Figure 2B:
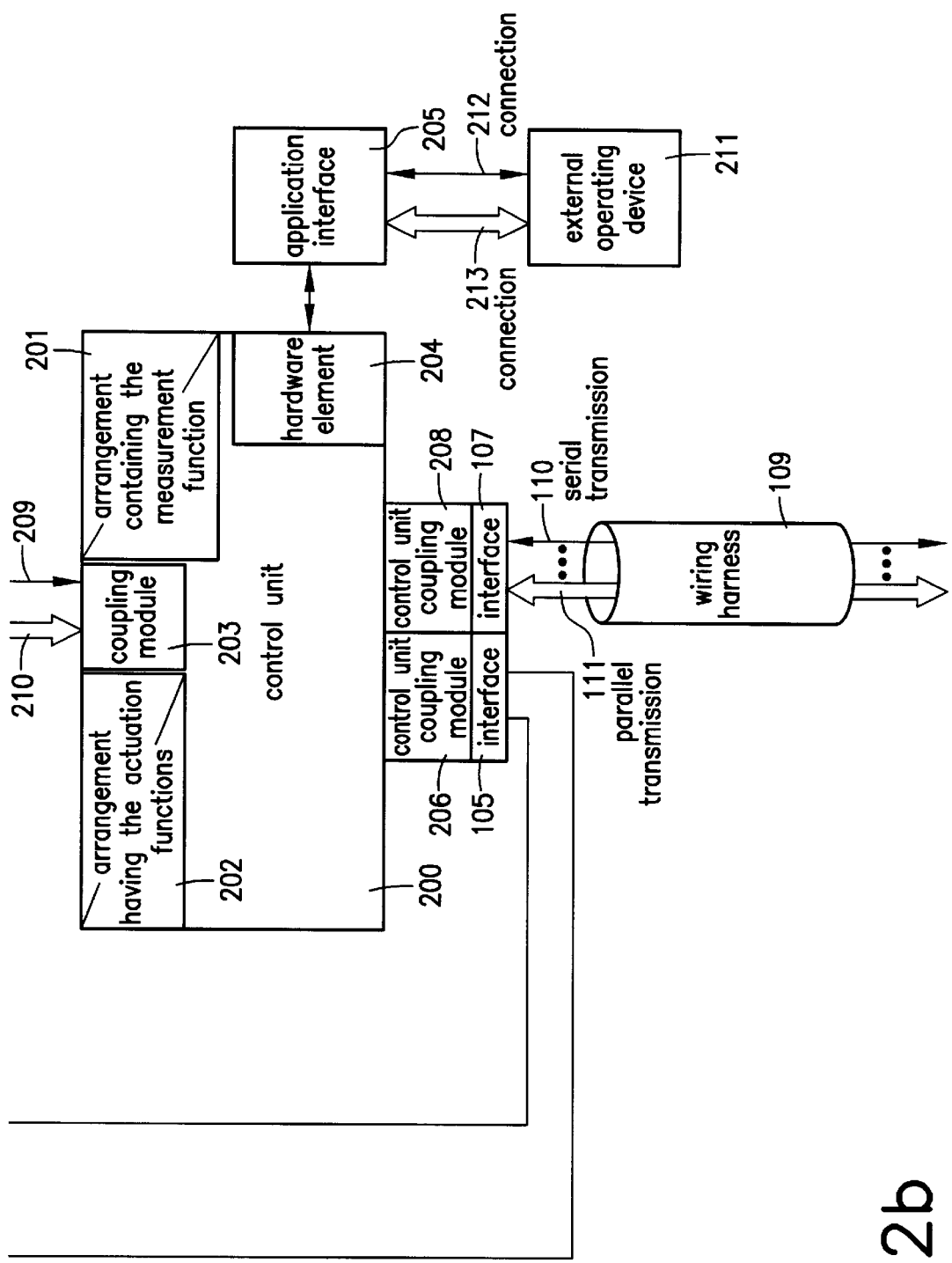

In FIG. 2, a further control unit 200 is interposed into the arrangement of FIG. 1 having one control unit. Wiring harness 109 with wiring-harness coupling unit 107 is now connected via control-unit coupling module 208 to control unit 200. Similarly, elements 103 and 104 with their coupling module 105 are also connected via control-unit coupling module 206 to control unit 200. In this context, control unit 200 can in principle contain the same functionality as control unit 100. An interface unit 203 may be used to connect the control unit 100. In this case, this connection is implemented, for example, via a bus 210 that can be embodied serially as a field bus, such as, for example, CAN, or in parallel fashion, and by way of a coupling module 207. In this case, connection 209 specifically represents the power supply for control unit 100. By the use of control-unit coupling unit 108 of control unit 100, to which vehicle wiring harness 109 was connected in FIG. 1, all the possibilities for coupling control unit 100 and control unit 200, i.e., serial, parallel, analog, digital, etc., can be provided for. Coupling modules 207 and 203 may be correspondingly designed.

Second control unit 200 can be designed, for example, as an application control unit APSG. An additional hardware element 204 can then be mounted on this control unit 200 as described above. This additional hardware element 204 can then contain an additional modifiable-content data memory, and a capability for connecting an application interface 205. Application interface 205 could also be integrated directly into additional hardware element 204

Advantageously, the same control device can be used for control unit 200 (in this case, the application control device APSG) as for control unit 100 (in this case, the production or local control device VSG). This allows economical manufacture of an application control device APSG. On the other hand, because control unit 200 is easily accessible and modifiable, a functionally very complex application control device APSG may also be manufactured. This is demonstrated, for example, if the application interface 205 is incorporated into additional hardware element 204. In general, however, the application control device APSG (i.e., control unit 200) can be provided as a standard application unit for at least one specific production run of control units 100, which may greatly reduce the manufacturing outlay as compared to the resulting capabilities.

In the arrangement shown in FIG. 2, the control unit-side function of coupling module 106 is not needed and is thus blanked out. The same is true of the arrangement 201 which contains the measurement function, and of the arrangement 202 having the actuation functions. This is indicated in FIG. 2 by oblique lines, so that an external operating device, such as, for example, a PC, can now be connected at application interface 205, in serial fashion via connection 212 and/or in parallel fashion via connection 213. External operating device 211 is then used to modify the data and/or programs in at least one memory. This is done, for example, using the modifiable-content memory contained in additional hardware element 204. As control unit 100 continues to operate, the control functions of control unit 100 that access the data and/or programs to be modified and/or adapted are suppressed in control unit 100. This can even be extended so that the control functions are not at least partially suppressed, but rather are completely suppressed. The suppressed control functions are then performed by control unit 200, which thus contains the suppressible control functions of control unit 100. If, as already described above, the same basic control units are used for control units 100 and 200, then the control functions of control unit 100 are also contained in control unit 200.

Figure 3:
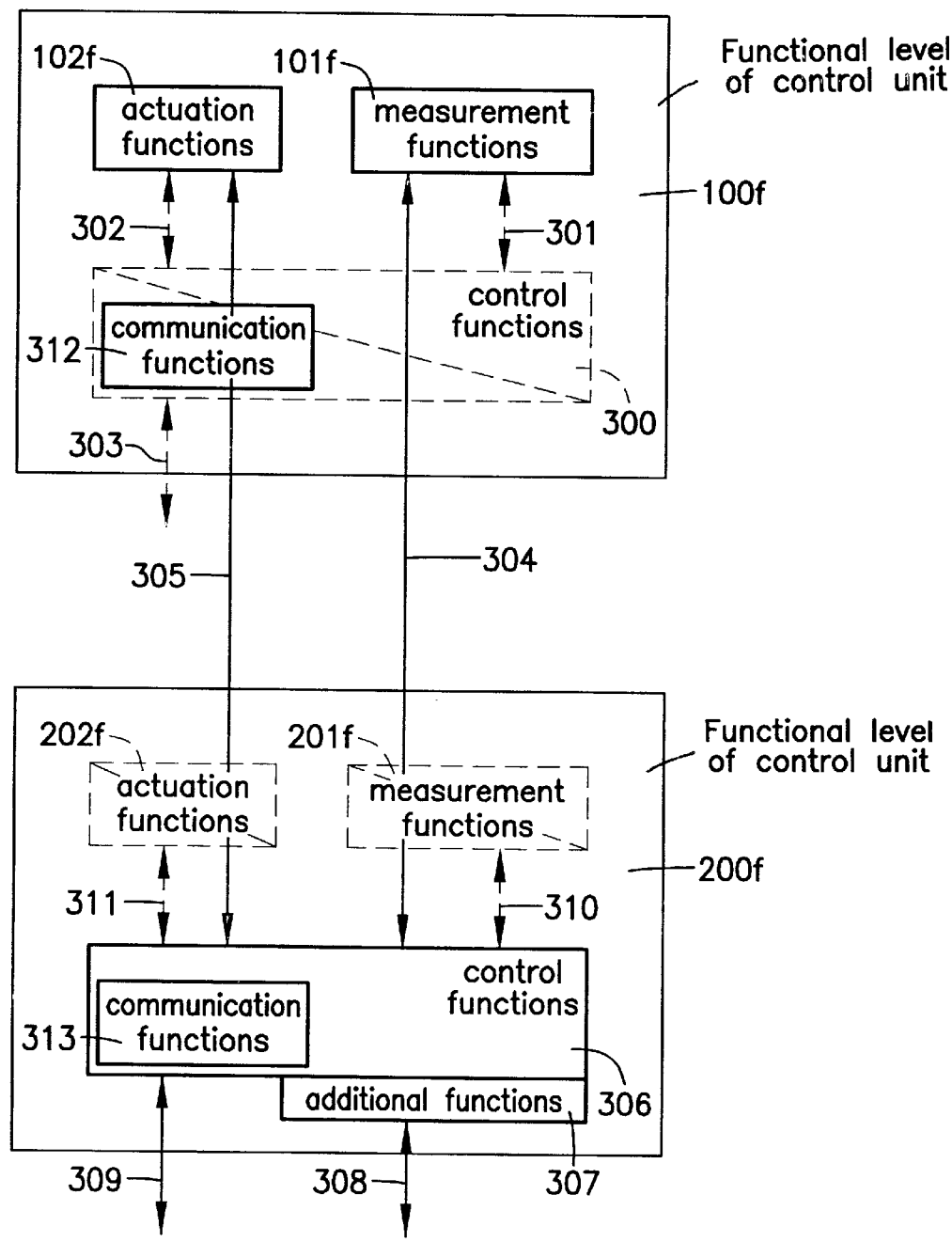
FIG. 3 shows the functional structure of the control units of the arrangement of FIG. 2.

This functional correlation is shown schematically in FIG. 3, which depicts the functional level of control unit 100 as 100$f$, and the functional level of control unit 200 as 200$f$. In principle, functional level 100$f$ contains measurement functions 101$f$, actuation functions 102$f$, and control functions 300. In addition, the number 312 indicates communication functions that also contain a remote-control function. These are added on, for example, to control functions 300. In the case of a built-in control unit 100, communication relationships 301 and 302, created by communication functions 312, may exist between measurement functions 101$f$ and control functions 300, and actuation functions 102$f$ and control functions 300. External communication relationships 303 of functional level 100$f$ also reside in communication block 312.

The same configuration, in principle, is provided on functional level 200$f$ of control unit 200. In the simplest case, the measurement, actuation, communication, and control functions correspond to one another. Only block 307 makes available additional functions in terms of additional hardware element 204 and application interface 205, and interface 203. These additional functions act externally via communication path 308. This path contains the additional external action of functional level 200$f$, in addition to the usual sensor, actuator, and/or wiring-harness connection 309. Measurement functions 201$f$, actuation functions 202, control functions 306, and communication functions 313 also exist here. The internal communication relationships are depicted here as 310 and 311. Suppression of the control functions or of some of control functions 300 and of the pertinent communication relationships 301 to 303 can be accomplished by way of communication functions 312 when only one control unit is used, or, alternatively, by way of communication functions 312 or 313 when two control units are used. The same is then true of the possible suppression of measurement functions 201$f$ and of actuation functions 202$f$ and of the pertinent communication relationships 310 and 311 in control unit 200. If the arrangement is used in the exemplary manner referred to for the application, the measurement and actuation functions 201$f$ and 202$f$ and the associated communication relationships 310 and 311 can be deactivated in advance. The replacement communication relationships 304, 305 and 308, must be created to the same degree to which the individual aforesaid functions and communication relationships are suppressed. Thus, the measurement functions and actuation functions remain in control unit 100 and on its functional level 100ƒ (i.e., in the application example, in local control device VSG), and the control functions are performed on functional level 200ƒ to the same degree to which they are suppressed on functional level 100ƒ. The two control functions 300 and 306 contain communication functions 312 and 313, respectively, in which remote-control functions for starting the operation are also provided. One or the other remote-control function can be activated depending on the type of execution.

The regular control functions can thus be performed in the application control device APSG. The local control device VSG contains, for example, the control functions and the remote-control functions. Following a decision between normal mode and application mode, in the case of an application mode, the remote-control functions are then selected and the application control device starts an initialization sequence.

In addition to an application, in a further operating instance in which only one control unit is being used, communication relationships 301 through 303 would need to be maintained by communication functions 312 in order at least partially to suppress control functions, such as, for example, on the basis of a driver input in the case of systems not relevant to safety. If the operational sequences are error-free, then there is at least partial blanking of control functions that, for example, are implemented as additional functions and are not absolutely necessary for the actual operation of the vehicle.

Figure 4A:
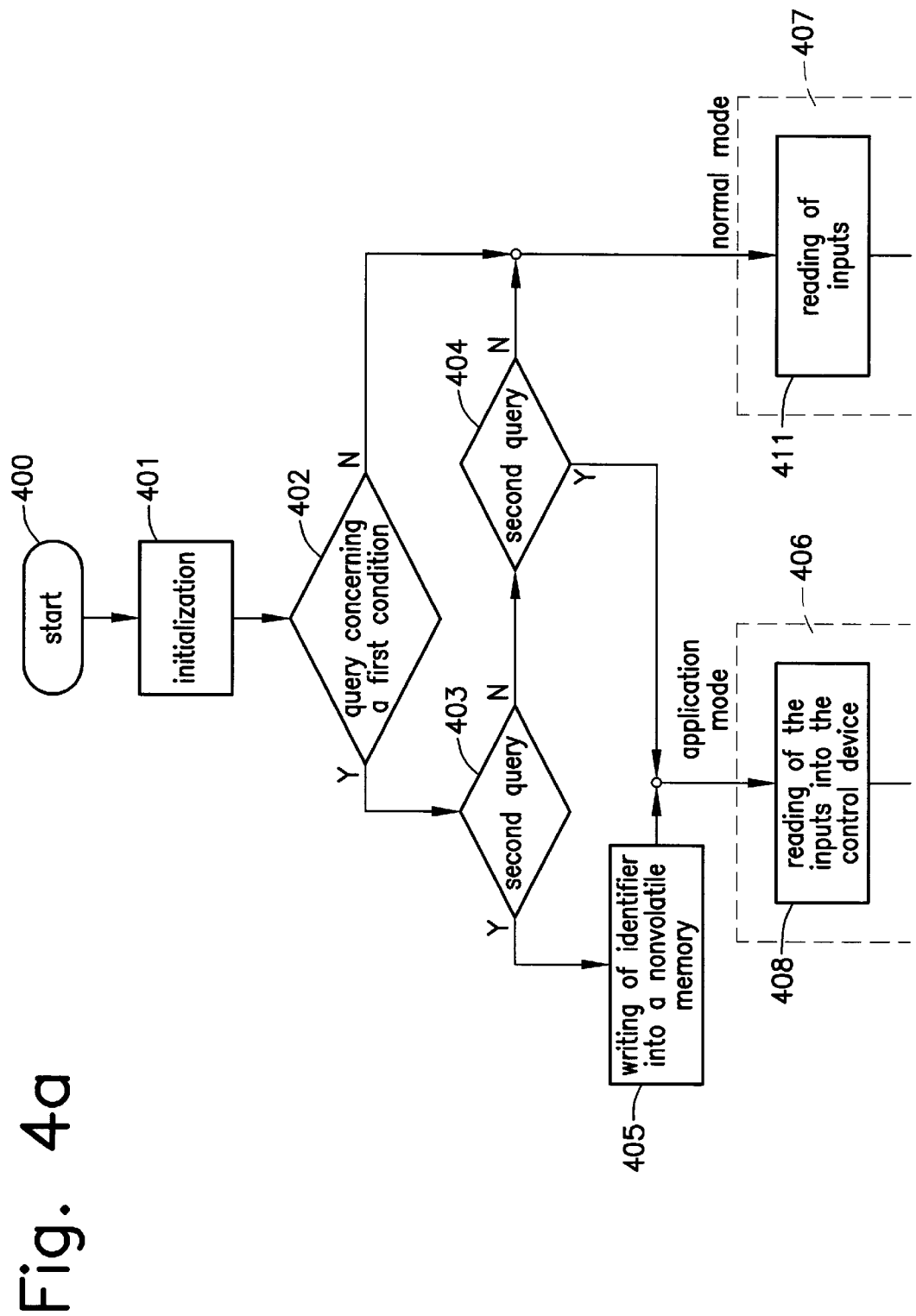
FIG. 4 shows a method for operating in the specific operating instance with two control units to modify and/or adapt data and/or programs.
Figure 4B:
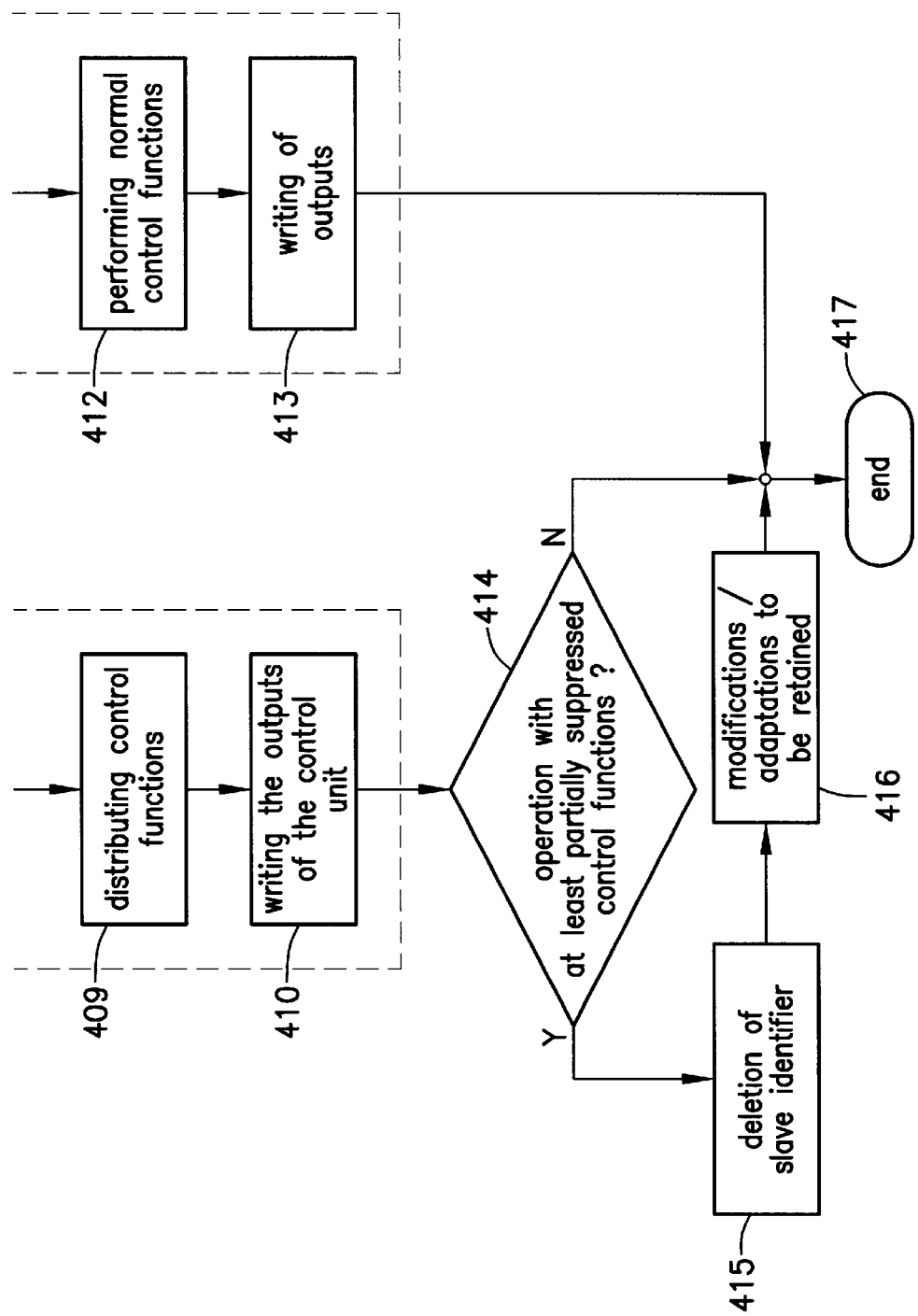

FIG. 4 shows the procedure for switching the individual functions in and out for the purpose of adaptation and/or modification of data and/or programs in a memory to which the control functions have access. The method starts in block 400, and is triggered by the remote-control function in communication functions 312 or 313. Initialization takes place in block 401. If a suppression of control functions is to be accomplished, a relevant signal is performed. This signal may come from control unit 100 itself or, if a control unit 200 is interposed, from the latter. This signal can be, for example, an identification or a key by way of which control unit 200 legitimizes itself as the master of the control functions that are suppressible or intended for suppression. Also in block 401, a definition can be made as to which portion of the control functions is to be suppressed. From block 401, execution passes to query 402 in which a first condition is queried. This first condition is, for example, the presence of the signal from block 401, such as, for example, in the form of a master identification MID. If this condition (presence of MID) is not met, execution passes to sequence 407 and thus to normal mode. If the first condition is met, i.e., if control unit 200 or a subfunction of control unit 100 has legitimized itself as master, execution passes to query 403. Second query 403 or 404, in addition to query 402, also provides security, so that the transition into the application mode, i.e., the mode in which control functions in control unit 100 are partially suppressed, takes place only if multiple conditions are met. Query 403 may contain, for example, a time condition, so that access to the application and to suppression of the control functions occurs only in a brief time window after initialization in block 401. If the time condition of query 403 is not met, i.e., if the time window has been exceeded, execution passes to query 404.

Query 404 checks whether a nonvolatile memory contains an identifier that identifies control unit 1 as the slave, i.e., as a control unit having control functions that are to be suppressed. If this identifier is not present, execution once again passes to the normal mode sequence 407. If the identifier is present, execution passes to sequence 406, which results directly in at least partial suppression of control functions and is hereinafter referred to as *application mode*. If the time condition is met, i.e., if process execution is still within the time window following initialization in block 401, then in block 405 the identifier is written into a nonvolatile memory which allows recognition, in query 404, that control unit 100 and the control functions located therein have slave status. After the identifier has been written, execution passes, in the same manner as from query 404, to sequence 406 (application mode). In block 408, the control functions in control unit 100 that were defined in block 401 (for example, all control functions) are suppressed in control unit 100. At the same time, the new communication relationships, for example as depicted in FIG. 3, are established. The inputs into the control device are then additionally read in block 408.

Execution then passes to block 409, in which the control functions distributed, depending on the operating state, to control unit 100 and control unit 200 are performed. In full application mode, control functions in control unit 100 are completely suppressed and are instead performed in control unit 200. Once the control functions have been processed, execution passes to block 410, in which the outputs of the control unit are written. Writing of the outputs and reading of the inputs is performed either only to one control unit (if only one is present) or, in application mode, to control units 100 and 200. Once the outputs have been written in block 410, execution passes to query 414, which checks whether operation with at least partially suppressed control functions, or full application mode, is to be continued. This effectively determines whether the slave identifier is to be deleted from block 405 (query 404). If the identifier is not to be deleted (i.e., if an application mode, or operation with at least partially suppressed control functions, is to be maintained), execution passes to block 417 at the end of this sequence. Otherwise, the next step is block 415, in which the slave identifier is deleted. In the subsequent block 416, a query is made as to whether the modifications and/or adaptations made in block 409 to the data and/or programs to which the control functions have access are to be retained, i.e., written into control unit 100 and thus permanently established. As a function of this, in block 416 the modified or adapted data and/or programs are then also written or discarded. From block 416, execution then passes to the end of the procedure in block 417.

If the conditions from queries 402, 403, and 404 as depicted in FIG. 4 are not met, execution passes, in accordance with the method depicted, to sequence 407 (normal mode). Another initialization either may or may not be performed here, depending on the operating mode. In block 411, the inputs of the one or two control units are then read. In block 412, performance of the normal control functions then follows, and they are not suppressed in control unit 100. Then, in block 413, the outputs are written. Depending on whether data and/or programs were modified and/or adapted in a preceding execution sequence, they are used in block 412 by the control functions. From block 413, execution then once again passes to the end of the sequence in block 417. In block 409, where the at least partially suppressed control functions are performed elsewhere, for example, in control unit 200, an adaptation of the same or of the data and/or programs can be accomplished by the external operating unit 211 via the application interface. The operational sequences can thereby be optimized. Besides optimization, only visualization and evaluation of the suppressed control functions may be performed in block 409, via control unit 200 and external operating device 211.

The entire procedure can, as already referred to above, also be performed with only one control unit 100, provided the latter is connected, for example, such as, via vehicle wiring harness 109, to a control device, such as 211, that can be built into or carried in the vehicle. Operating instances other than the modification and adaptation of data and/or programs (i.e., application) would then also be conceivable.

What is claimed is:

1. A method for operating a control unit for controlling operational sequences in a vehicle, the control unit performing at least control functions, the method comprising the steps of:

determining if the operational sequences are error-free;
   providing at least one definable condition; and
   at least partially suppressing performance of the control functions in the control unit in reaction to the at least one definable condition so as to provide at least partially suppressed control functions if the operational sequences are error-free.

2. The method of claim 1, further comprising the step of:

using a second control unit for performing at least the at least partially suppressed control functions of the control unit as a function of the at least one definable condition, wherein the second control unit is coupled to the control unit and another control functions of the second control unit correspond to the control functions of the control unit.

3. The method of claim 1, wherein the control functions access at least one of data and programs, and the control functions at least one of modify and adapt the at least one of data and programs.

4. The method of claim 1, wherein the control unit performs at least one measurement function and at least one actuation function.

5. The method of claim 1, wherein in the step of at least partially suppressing performance, the performance of the control functions of the control unit is completely suppressed.

6. The method of claim 2, wherein the at least one definable condition corresponds to a signal from the second control unit.

7. The method of claim 1, wherein the at least one definable condition corresponds to a time condition.

8. The method of claim 1, wherein the at least one definable condition corresponds to an existence of an identifier.

9. The method of claim 4, wherein the control unit continues to perform the at least one measurement function and the at least one actuation function after performance of the control functions has been at least partially suppressed.

10. An apparatus for operating a control unit for controlling operational sequences in a vehicle, the apparatus comprising:

means for performing control functions; and
    means for at least partially suppressing performance of the control functions by the means for performing when operational sequences are error-free and in reaction to at least one definable condition for providing at least partially suppressed control functions.

11. The apparatus of claim 10, further comprising means for performing the at least partially suppressed control functions.

12. The apparatus of claim 10, further comprising a second control unit for coupling to the control unit, wherein another control functions of the second control unit correspond to the control functions of the control unit, and the second control unit performs at least the at least partially suppressed control functions of the control unit as a function of the at least one definable condition.

* * * * *